(12) United States Patent
Ficca et al.

(10) Patent No.: US 6,183,806 B1
(45) Date of Patent: *Feb. 6, 2001

(54) METHOD OF MAKING CITRUS FRUIT PEEL EXTRACTS AND FLOUR

(75) Inventors: Vincent G. Ficca, Princeton Junction, NJ (US); Michael Grossman, West Harrison; Thomas Rohmann, Mahopac, both of NY (US)

(73) Assignee: Joseph E. Seagram & Sons, Inc., White Plains, NY (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/987,314

(22) Filed: Dec. 9, 1997

(51) Int. Cl.⁷ .............................. A23L 1/015; A23N 1/00; A23N 1/02

(52) U.S. Cl. .................... 426/616; 426/429; 426/481; 426/492; 426/494; 426/495; 426/640

(58) Field of Search ..................................... 426/616, 640, 426/481, 492, 494, 495, 429

(56) References Cited

U.S. PATENT DOCUMENTS

| | | | |
|---|---|---|---|
| 2,147,521 | * 2/1939 | Bustamante | 426/616 |
| 2,452,750 | * 11/1948 | Halliday et al. | 426/616 |
| 4,451,489 | * 5/1984 | Beale et al. | 426/616 |
| 4,497,838 | * 2/1985 | Bonnell | 426/429 |
| 5,292,421 | * 3/1994 | Senapati et al. | 204/300 |
| 5,409,541 | * 4/1995 | Walker . | |

* cited by examiner

*Primary Examiner*—Helen Pratt
(74) *Attorney, Agent, or Firm*—Pitney, Hardin, Kipp & Szuch, LLP

(57) ABSTRACT

A process for the recovery of valuable products from citrus peel includes comminuting the peel, belt filter pressing to remove contained liquid and solvent extraction to remove organic compounds. The dried, milled flour is useful as an ingredient in breads and other baked products, replacing part of the grain flour conventionally used.

22 Claims, 1 Drawing Sheet

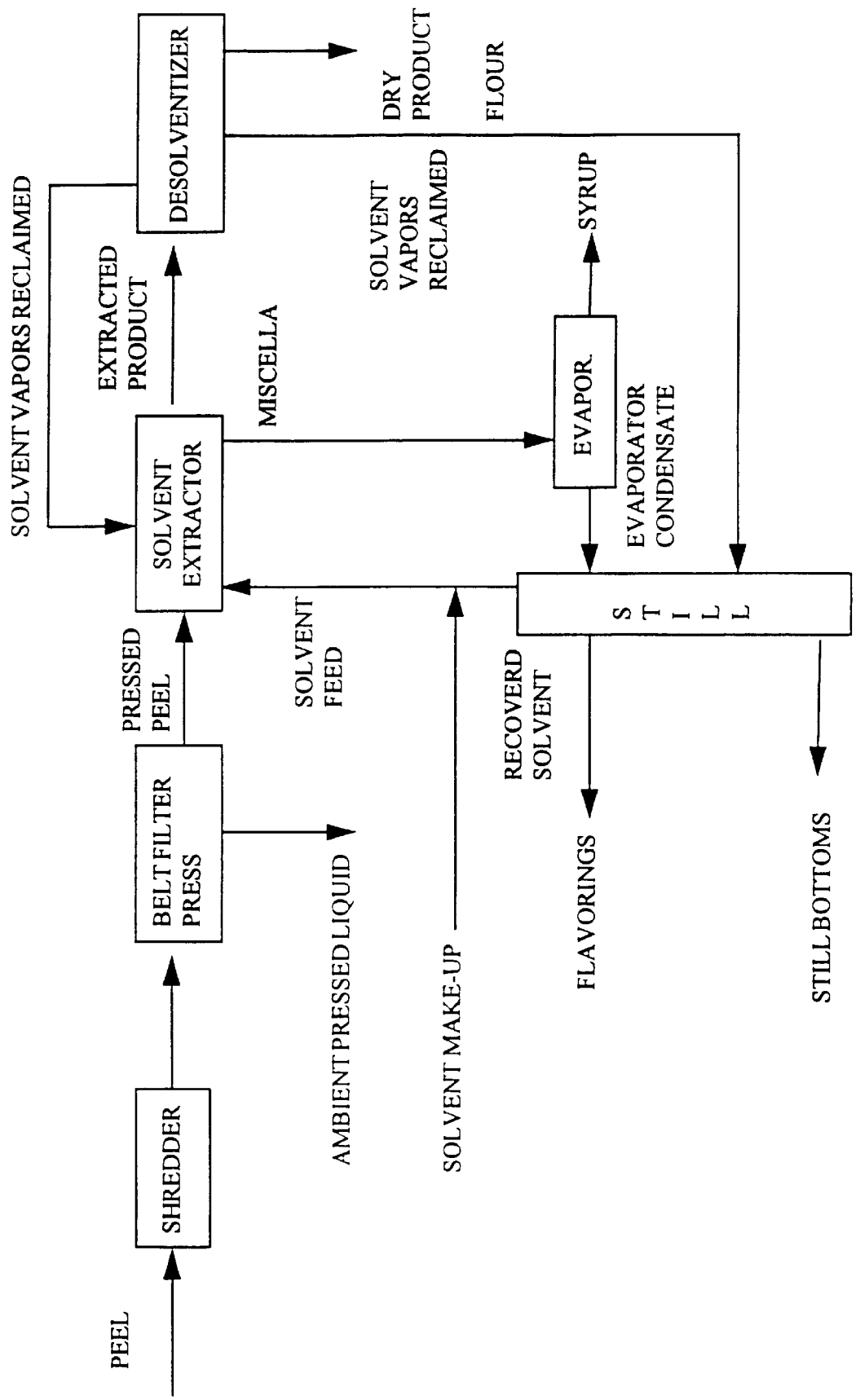

METHOD OF MAKING CITRUS FRUIT PEEL EXTRACTS AND FLOUR

BACKGROUND OF THE INVENTION

1. Field of the Invention

The invention relates to processes for recovering valuable organic compounds and materials from citrus fruit peel and in particular to the separation of valuable compounds and conversion of the peel to a flour useful for example in the baking industry.

2. Brief Description of Related Art

One of the major problems encountered over the years with respect to the production of citrus juice, citrus concentrate and sections has been the disposal of the various waste products including the peel, seeds, rag and pulp. For many years these materials were believed to be of little practical value and, accordingly, were simply disposed of as waste without being processed in any way.

In recent years, however, it has been found that certain of these waste materials (e.g., the peel) could be further processed to provide an excellent and highly nutritious cattle feed. Unfortunately, while the use of such processed wastes did help to alleviate a portion of the waste disposal problem, the processing of the wastes to provide cattle feed was not as economically attractive as had been hoped.

Accordingly, efforts have recently been made to process such waste materials to provide products which are suitable for human as well as animal consumption. It is also desirable to provide a diverse range of products from the processing of such materials in order to take full advantage of the raw materials contained therein. For example, the peel is a virtual chemical compound warehouse, containing many organic compounds useful as pharmaceuticals, fragrances, enzymes, food chemicals and the like. These chemical compounds continue to be wasted and not fully utilized.

Unfortunately, the waste materials are not easily processed. For example, U.S. Pat. No. 2,215,944 discloses a process where the orange peel is treated with lime to provide a product suitable for use as cattle feed. However, the use of lime is not advantageous as it generally yields a bitter tasting product.

In addition, the pectin which is present in the peel is destroyed or damaged during processing with lime, thus removing one of the desirable components in the peel from the standpoint of human and animal consumption. However, the peel is difficult to process without the use of lime or related materials (e.g., magnesium or aluminum containing compounds) since it is very slimy. The processed peel is also difficult to dry due to the cellular structure of the peel which is usually rendered less intact through contact with materials such as lime.

In addition, the peel contains a substantial amount of various sugars which are desirably removed from the peel in order to reduce the caloric content of the finished product. The sugars are very hygroscopic and, if present in significant amounts, also render the processed peel very difficult to dry. The peel also contains significant amounts of essential oils (i.e., naturally occurring volatile oils) which are the odor and/or flavor component of the peel. The essential oils can provide bitter or unpleasant taste sensations and are thus desirably removed from the peel.

As an alternative to lime processing, waste peels have been washed with water to remove portions of the sugars and bad flavors present. Such aqueous washing does not, however, remove much of the essential oils which are present. Carotenoid pigments also remain in the product, and after a short period of time, oxidize to produce an unpleasant "haylike" flavor. The water-washed products are also difficult to press in order to remove excess water. The finished product thus generally contains an unreasonably high water content (e.g., 85 percent by weight or greater), rendering the product expensive to dry. An additional waste material in the form of the wash water is also created which is difficult to treat due to the presence of the sugars and other peel-derived components which have been extracted from the peel. It is therefore desirable to provide an improved process for the treatment of the waste materials derived from the processing of citrus fruit in order to produce a variety of useful products which are suitable for human and animal consumption. It is also desirable to provide a process which is more attractive economically as well as more efficient than the processes conventionally employed in the citrus fruit processing industry.

SUMMARY OF THE INVENTION

It is an object of the present invention to provide a process for the recovery of a wide variety of products suitable for human and animal consumption from citrus peel waste.

It is also an object of the present invention to provide an efficient and economically attractive process for the treatment of citrus peel waste. The process of the invention comprises a process for the recovery of useful products from the peel of citrus fruit, which comprises;

providing the peel in a comminuted form;

pressing the comminuted peel to separate contained peel fluids, whereby a peel solid is obtained;

solvent extracting the pressed peel solids; and desolventizing the extracted peel;

whereby a dry peel flour is obtained.

The term "citrus" is used in its ordinary meaning of orange, grapefruit, lemon, tangerine and lime fruit.

The invention also comprises the products of the process, including in particular the dried flour obtained by the solvent extracted and other peel components separated during processing.

BRIEF DESCRIPTION OF THE INVENTION

The drawing schematically depicts the process of the present invention wherein citrus fruit-derived peel is treated to provide a variety of products.

DETAILED DESCRIPTION OF THE INVENTION

The process of the present invention will be described in conjunction with a viewing of the drawing. In accordance with the process of the present invention, citrus peel is provided which consists of waste peel from a conventional processing of citrus fruit to obtain juice. The peel is provided in a comminuted form, i.e., diced, chopped or shredded advantageously to provide pieces of peel having an average particle size of from about 13 mm to about 1 mm (approximately ½ inch to about ¹⁄₁₆ inch). The comminuted particles or pieces provided may also be in the form of a washed pulp (pomace) in an alternate embodiment of the invention. The washed pulp (pomace) may be dried by indirect heat to reduce its moisture content before processing in accordance with the invention.

Advantageously, the provided comminuted peel or washed pulp has a water content in the range of from about 65 to 90 percent by weight. If necessary, the comminuted peel can be dried as well as the washed pulp (pomace).

As depicted in the accompanying drawing, an initial step in the process of the invention comprises removing liquids or juices retrained in the provided citrus peel or washed pulp (pomace). In respect to the citrus peel, the comminuted peel is preferably delivered from a shredder or other comminuting device to a continuous belt filter press, free of seeds.

Description of representative belt filter presses is found in U.S. Pat. Nos. 4,236,445; 4,297,215; and 5,022,989 which are incorporated herein by reference.

First the citrus peel particles are pressed to reduce initial weight. Pressing is used to remove between 5% and 40% of the initial peel weight as a liquid containing between 6% to 18% solids including citrus oils. Pressing is necessary to improve the following extractor efficiency by lowering the amount of soluble solids that need to be removed to produce citrus peel flour.

Belt filter pressing can be performed with or without the addition of potable water before or during a pressing cycle. The amount of potable water used may be less than 3 to 1, that is, three pounds of potable water are added to one pound of peel before and/or during pressing. Pressing may range from 2 pounds to 50 pounds of pressure per linear inch on a belt filter press. The pressing process will retain a significant amount of the dietary fiber solids, while permitting drainage of the liquid expressed from the peel.

For example, one adds 4 pounds of water to approximately 40–45 pounds of shredded peel before pressing. A preferred belt filter press is the Komline-Sanderson Belt Filter Press, a continuous processing system (GRS Series III).

The citrus peels' feed weight to the belt filter press is advantageously reduced—by not less than 5% and not more than 40% by pressing. The pressing does not require any processing aids, such as lime, rice hulls, etc. The pressing operation may include added enzymes to expedite the release of liquid during belt filter pressing.

In respect to a press feed of washed pulp (pomace) belt filter pressing as an initial step is preferred, but not mandatory, if the water content of the pomace is within the range of from about 65 to about 90 percent by weight.

Belt pressing of the citrus peel before solvent extraction is not critical to convert the peel to flour. The belt pressing improves the efficiency of the following extractor by increasing output (yield). The pressed liquids or juices from the belt press may be separately processed to recover water soluble peel compounds, using separation technology. Valuable citrus oils can also be separated from the juice pressing.

After dewatering, the citrus peel or pomace is solvent extracted to remove alcohol soluble organics. As shown in the drawing, the pressed peel or pomace enters a solvent extractor, where most of the peel is converted into flour. The peel solids removed by the solvent could be used in other commercial products.

The solvent extractor can be counter current type. For example, a continuous percolation type extractor was employed. A preferred extractor is the Crown Iron Works continuous percolation extactor.

The general parameters for operating the extractor unit are as follows:

Solvent to feed ratio of not more than 5 to 1, and not less than 3/4 to 1 (weight to weight ratio).

The operating temperature of the continuous percolation extractor is not less than 40 degrees Fahrenheit and not more than 173 degrees Fahrenheit at atmospheric pressures, depending on the solvent selected. Temperatures can be appropriately increased or decreased for operation under super or sub atmospheric pressure. However, slight negative pressures are preferred.

The solvent is preferably water miscible, low molecular weight alkanol such as methanol, ethanol, propanol, butanol and the like. Water miscible solvent is required to remove water, sugars, oils, colorings, flavor and like organics. The solvent at lower strength will remove water soluble materials while at higher strength it will remove oil soluble materials. A preferred strength will be in the range of 70% to 100%.

Since the preferred solvent (ethanol) has a lower heat of vaporization than water, it requires less energy per pound to volatilize as compared to water. The solvent is removed and reclaimed for re-use or other purposes.

Extraction times, residence in the extractor, solvent type and temperature, through the extractor operation, may be solicited to assure a minimum of 70% recovery. For practical purposes, the residence time for the pressed peel solids in the extractor may be from 10 to 240 minutes, preferably 30 to 90 minutes.

For example, 2,000 pounds of ethanol solvent is required to convert 1,000 pounds of citrus peel to flour. (The solvent to peel ratio is about 2:1).

Approximately 70 to 250 pounds of the citrus peel solids entering the extractor are converted to orange flour. The remaining solids, approximately 30 to 150 pounds, have been removed by the solvent and have a higher potential value than cattle feed. The solvent extractor will separate from the solids a stream (miscella) of the solvent soluble compounds. These compounds are removed from the extractor and directed to an evaporator, where the volatile compounds are removed and the non-volatile are concentrated. The syrup contains many valuable organic compounds which can be separated. The volatile compounds removed from the evaporator can be directed to further purify the solvent. The recovered solvent is returned to the solvent extractor for re-use. By-products of the distillation column (s) include flavoring compounds and the still bottoms which are comprised mostly of water.

A second belt filter press (not shown in the drawing) is optional after solvent extraction to further remove liquids. Following solvent extraction or second belt pressing the solids are carried to a Desolventizer. This unit operation removes the analytical moisture (solvent and water) from the solids remaining after extraction. This unit operation is necessary to reclaim the solvent for future use. This unit operation also assures that the solid product is safe for milling and commercial use.

This desolventizing unit uses indirect heat to remove significant amount of the solvent from the solid residue. Direct steam may be employed to remove trace amounts of solvent remaining in the solids. The vapors from the desolventizer may be fed to the distillation column(s), otherwise they are recycled back to the extractor.

Solvent is lost in the process as carryover to the dried flour or lost during the extraction, desolventation or distillation. The loss from processing is minimized because the system is completely enclosed and the solvent vapors are reclaimed by condensation. By distillation, the solvent vapors are purified and condensed for reuse. Without this process, the operation would cost significantly more. The evaporator unit operation is not necessary to operate the distillation system efficiently. Its primary purpose is for separating the solids (sugars, pectin, fiber and citrus oils) and water from the spent solvent (miscella).

This evaporator unit will separate the sugars and many of the other components. The syrup mentioned above consists mainly of water, sugars, colorants, flavorings and other food chemicals.

After desolventizing, the dried product (flour) is ready for milling.

The following examples show the method and procedure for carrying out the invention, but should not be taken as limiting the scope of the invention.

EXAMPLE 1

Processing of Orange Peel

Following the above-described process of the invention, a given quantity of shredded orange peel was pressed, solvent extracted and dried to obtain a flour.

The flour obtained, upon analysis, showed:

| COMPONENT | Weight/Weight |
|---|---|
| % PECTIN: | Not less than 10% and not more than 33%. |
| % DIETARY FIBER (including Pectin): | Not less than 60% and not more than 80%. |
| % PROTEIN: | Not less than 5% and not more than 15%. |
| % Ash: | Not more than 6%. |
| % SUGARS: | Not more than 6%. |
| % OIL: | Not more than 0.5%. |
| % MOISTURE: | Analytical Moisture: Less than 15%. |

EXAMPLE 2

Processing of Washed Pulp (Pomace)

Repeating the procedure of Example 1, supra., but replacing the shredded orange peel with shredded orange pulp or pomace, a flour was obtained.

The general composition of orange washed pulp (pomace) after extraction and drying is as follows:

| COMPONENT | Weight/Weight |
|---|---|
| % PECTIN: | Not less than 7.5% and not more than 32%. |
| DIETARY FIBER (including Pectin): | Not less than 60% and not more than 80%. |
| % PROTEIN: | Not less than 5% and not more than 15%. |
| % Ash: | Not more than 6%. |
| % SUGARS: | Not more than 6%. |
| % OIL: | Not more than 0.5%. |
| % MOISTURE: | Analytical Moisture: Less than 15%. |

This product (washed pulp/pomace), also called orange flour, will have similar composition as orange flour derived from peel.

The flour obtained as described above is useful when replacing part of the flour derived from grains used in the preparation of bread, cakes, cookies and other baked products. Also, the flour obtained, as described above, could be used in many other food products as a source of dietary fiber, etc.

EXAMPLE 3

A quantity of orange peel was subjected to hammer milling, belt pressed and extracted with ethanol according to the above-described process. Ethanol extraction was for 60 minutes at a temperature of 120° F. The processing conditions were as follows:

| PROCESSING CONDITIONS | | | | |
|---|---|---|---|---|
| OPERATION | FLOW RATE POUNDS PER MINUTE | % MOISTURE | % SOLIDS | % ALCOHOL BY VOLUME |
| Orange Peel after Hammer Milling | | 72.13% | 27.87% | |
| Orange Peel Feed to Belt Press | 3.35 | 72.13% | 27.87% | |
| Pressed Liquid from Belt Press | 0.53 | 83.10% | 16.90% | |
| Pressed Orange Peel Feed to Solvent Extractor | 2.82 | 70.07% | 29.93% | |
| Ethanol Solvent Feed to Extractor | 8.50 | | | 95.00% |
| Extracted Orange Peel Feed to Desolventizer | 1.44 | | | |
| Miscella (Spent Solvent from Extractor) | 9.88 | | 3.32% | 75.80% |
| Orange Flour (After Desolventizing) | 0.56 | 8.00% | 92.00% | |

| THE PRODUCT FLOUR OBTAINED SHOWS A CHEMICAL ANALYSIS AS FOLLOWS: | |
|---|---|
| Analyses/Sample ID | ORANGE FLOUR |
| Extraction Temperature - F. | 120 |
| Extraction Time - Minutes | 60 |
| Solvent Ratio | 3 to 1 |
| % Moisture | 8.00% |
| % Solids | 92.00% |
| % Oil (By Weight) | ND |
| % Insoluble Dietary Fiber (By Weight) | 42.23% |
| % Soluble Dietary Fiber (By Weight) | 30.45% |
| % Total Dietary Fiber (By Weight) | 72.68% |
| % Pectin (By Weight) | 24.60% |
| (Pectin is part of the soluble fiber content) | |
| % Protein (By Weight) | 14.20% |
| Sugars (by weight) | 0.92% |
| glucose | 0.47% |
| fructose | 0.45% |
| sucrose | ND |
| Lactose | NA |
| Maltose | NA |
| Sorbitol | ND |
| % Ash (By weight) | 3.71% |

| A CHEMICAL ANALYSIS OF THE SPENT SOLVENT WAS AS FOLLOWS: | |
|---|---|
| | Miscella |
| % Alcohol by Volume | 75.80% |
| % Solids (W/W) | 3.32% |
| % Oil (by weight) | 0.23% |
| Sugars (by weight) | |
| glucose | 1.45% |
| fructose | 1.06% |
| sucrose | 0.39% |
| Total Sugars | 2.909% |

| THE JUICE SEPARATED ON THE BELT PRESS SHOWED A CHEMICAL ANALYSIS AS FOLLOWS: | |
| --- | --- |
| | Juice from Pressed Orange Peel |
| Specific Gravity | 1.055 |
| % Moisture by Weight | 83.10% |
| % Solids by Weight | 16.90% |
| % Oils by Weight | 2.98% |
| % Sugar by Weight | 8.23% |
| Glucose | 2.03% |
| Fructose | 1.60% |
| Sucrose | 4.60% |

What is claimed:

1. A process for the recovery of a flour substitute for human and animal consumption from citrus peel comprising the following steps:
   a) providing the peel in a comminuted form;
   b) belt pressing the comminuted peel to separate contained peel fluids, whereby a peel solid is obtained;
   c) solvent extracting the pressed peel solids;
   d) desolventizing the extracted peel whereby a dry peel is obtained;
   e) wherein said dry peel is milled to a consistency for use as a flour substitute; and
   f) providing a means to recover most of the solvent wherein said steps c and d are performed under enclosed conditions whereby solvent may be recovered.

2. The process of claim 1 wherein the citrus peel is an orange peel.

3. The process of claim 1 wherein the comminuted peel is pulp pomace from oranges.

4. The process of claim 1 wherein the comminuted peel has an average particle size within the range of 13 mm to 1 mm.

5. The process of claim 1 wherein the peel has a water content in the range of 65 to about 90 percent by weight.

6. The process of claim 1 wherein the pressing is under a pressure within the range of 2 pounds to 50 pounds per linear inch.

7. The process of claim 1 wherein the pressing is sufficient to remove not less than 5 to and not more than 40 percent of the weight of the peel as liquid containing soluble and insoluble solids without the addition of processing aids.

8. The process of claim 1 wherein water is added to the orange peel before and/or during the pressing.

9. The process of claim 8 wherein the amount of water added is less than 3 to 1 (water:peel w/w).

10. The process of claim 1 wherein the peel is dried or partially dried before the solvent extraction.

11. The process of claim 1 wherein the solvent extraction is carried out in a percolator type of extractor.

12. The process of claim 1 wherein the solvent is an alkanol.

13. The process of claim 12 wherein the solvent is water-miscible.

14. The process of claim 13 wherein the solvent is ethanol.

15. The process of claim 1 wherein the solvent to pressed peel ratio is not more than 5 to 1 (w/w) and not less than 3/4 to 1 (w/w).

16. The process of claim 1 wherein the solvent extraction is carried out at a temperature within the range of from about 40° F. to about 173° F. at atmospheric pressure or negative pressure.

17. The process of claim 1 wherein the solvent is ethanol and the solvent extraction is at a temperature of about 160° F. under atmospheric pressure or negative pressure.

18. The process of claim 1 wherein the solvent has a concentration within the range of from about 70% to about 100%.

19. The process of claim 1 wherein the solvent extracted solid is pressed on a filter press to remove liquid.

20. The process of claim 1 wherein solvent from the solvent extraction is re-cycled and recovered.

21. The process of claim 20 wherein at least 70 percent of the solvent from the extractor is recovered.

22. The process of claim 1 wherein the solvent extracted solids are desolventized with direct or indirect steam and dried.

* * * * *